(12) United States Patent
Boutherin et al.

(10) Patent No.: US 12,118,593 B2
(45) Date of Patent: Oct. 15, 2024

(54) DEVICE, SYSTEM AND METHOD FOR PROCESSING IMAGES THAT INCLUDE AMOUNTS

(71) Applicant: AMADEUS S.A.S., Biot (FR)

(72) Inventors: Jean Pierre Boutherin, Biot (FR); Jose Da Cruz, Biot (FR); Nicolas Guillon, Biot (FR)

(73) Assignee: AMADEUS S.A.S., Biot (FR)

( * ) Notice: Subject to any disclaimer, the term of this patent is extended or adjusted under 35 U.S.C. 154(b) by 327 days.

(21) Appl. No.: 16/936,545

(22) Filed: Jul. 23, 2020

(65) Prior Publication Data

US 2021/0034859 A1 Feb. 4, 2021

(30) Foreign Application Priority Data

Aug. 2, 2019 (FR) ...................................... 19 08871

(51) Int. Cl.
*G06F 16/51* (2019.01)
*G06F 3/14* (2006.01)
(Continued)

(52) U.S. Cl.
CPC .............. *G06Q 30/06* (2013.01); *G06F 3/14* (2013.01); *G06F 16/51* (2019.01); *G06Q 10/10* (2013.01);
(Continued)

(58) Field of Classification Search
CPC ........ G06V 30/416; G06V 30/10; G06F 3/14; G06F 16/51; G06Q 10/10; G06Q 40/12;
(Continued)

(56) References Cited

U.S. PATENT DOCUMENTS 9,196,006 B2 * 11/2015 Barrett ................. G06Q 20/045
2004/0085354 A1 5/2004 Massand
(Continued)

FOREIGN PATENT DOCUMENTS

WO WO-2018122642 A1 7/2018
WO WO-2019011804 A1 1/2019

OTHER PUBLICATIONS https://web.archive.org/web/20170727104704/https://www.permadi.com/tutorial/highlightLinks/index.html, Permadi, Highlighting Links (Year: 2017).*
(Continued)

*Primary Examiner* — Ilana L Spar
*Assistant Examiner* — Darnell A Pouncil
(74) *Attorney, Agent, or Firm* — PERRY + CURRIER, INC.

(57) ABSTRACT

A device, system and method for processing images that include amounts is provided. A receipt image is received at a controller of a computing device. The receipt image is rendered, at a display screen, the receipt image comprising a total amount region including a total amount of expenses in the receipt image. A total amount field, including a submission total amount associated with the total amount, is rendered at the display screen adjacent the receipt image. A link between the total amount region and the total amount field is rendered at the display screen, at the total amount region of the receipt image. Input is received confirming the submission total amount, via an actuatable option rendered at the display screen in association with the total amount field. The submission total amount is transmitted, via a communication interface, to an expense management system.

9 Claims, 11 Drawing Sheets

(51) Int. Cl.
- *G06Q 10/10* (2023.01)
- *G06Q 30/06* (2023.01)
- *G06Q 40/12* (2023.01)
- *G06V 30/416* (2022.01)
- *G06Q 20/04* (2012.01)
- *G06Q 20/40* (2012.01)
- *G06Q 40/02* (2023.01)

(52) U.S. Cl.
CPC ........... *G06Q 40/12* (2013.12); *G06V 30/416* (2022.01); *G06Q 20/042* (2013.01); *G06Q 20/405* (2013.01); *G06Q 40/02* (2013.01)

(58) Field of Classification Search
CPC .... G06Q 20/042; G06Q 20/405; G06Q 40/02; G06Q 10/101; G06Q 30/06
See application file for complete search history.

(56) References Cited

U.S. PATENT DOCUMENTS

| | | |
|---|---|---|
| 2009/0249224 A1 | 10/2009 | Davis et al. |
| 2011/0313754 A1* | 12/2011 | Bastide ................ G06Q 10/107 704/2 |
| 2014/0108210 A1* | 4/2014 | Chelst .................. G06Q 20/047 705/30 |
| 2014/0289645 A1 | 9/2014 | Megiddo et al. |
| 2015/0088557 A1* | 3/2015 | Huynh .................. G06Q 10/10 705/4 |
| 2019/0129973 A1 | 5/2019 | Truong et al. |

OTHER PUBLICATIONS https://stackoverflow.com/questions/35546454/is-there-any-way-to-get-text-to-highlight-when-you-click-on-a-tag-within-the-p, Is there any way to get text to highlight when you click on a # tag within the page? stackoverflow.com (Year: 2016).*

System and Method for Enabling Automated Processing of Expensable Documents for Expense Reimbursement, ip.com, psges 4 and 5 (Year: 2008).*

* cited by examiner

DEVICE, SYSTEM AND METHOD FOR PROCESSING IMAGES THAT INCLUDE AMOUNTS

FIELD

The specification relates generally to image processing and, and specifically to a device, system and method for processing images that include amounts.

BACKGROUND

Various activities undertaken by members of organizations (e.g. employees of a corporate entity) may require the members to incur expenses. Examples of such activities include travel, obtaining supplies, and the like. Reimbursement of such expenses typically occurs after the expenses have been not only incurred, but also paid for by the members. In other words, reimbursement is typically a retrospective process that may be poorly suited to applying expense policies, detecting potential fraud, and the like. Further, reimbursement processes are typically conducted manually, and may therefore be time-consuming and error-prone.

SUMMARY

An aspect of the present specification provides a method comprising: receiving, at a controller of a computing device, a receipt image; rendering, at a display screen, the receipt image, the receipt image comprising a total amount region including a total amount of expenses in the receipt image; rendering, at the display screen, adjacent the receipt image, a total amount field including a submission total amount associated with the total amount; rendering, at the display screen, at the total amount region of the receipt image, a link between the total amount region and the total amount field; receiving, via an actuatable option rendered at the display screen in association with the total amount field, input confirming the submission total amount; and transmitting, via a communication interface, to an expense management system, the submission total amount.

In some embodiments, the submission total amount at the total amount field is different from the total amount, and the method further comprises: receiving an indication of the submission total amount being different from the total amount; and rendering, at the display screen, the indication.

In some embodiments, the receipt image, as rendered at the display screen, includes an itemized expense region including an expense amount, the expense amount being a portion of the total amount, and the method further comprises: rendering, at the display screen, adjacent the receipt image, an itemized expense field including the expense amount and an adjusted expense amount; rendering, at the display screen, at the total amount region of the receipt image, a second link between the itemized expense region and the itemized expense field; and prior to transmitting the submission total amount to the expense management system, determining the submission total amount by adjusting the total amount using the adjusted expense amount.

In some embodiments, the receipt image, as rendered at the display screen, includes an itemized expense region including an expense amount, the expense amount being a portion of the total amount, the method further comprises: rendering, at the display screen, adjacent the receipt image, an itemized expense field associated with the itemized expense region; rendering, at the display screen, at the itemized expense region of the receipt image, a second link between the itemized expense region and the itemized expense field; receiving an indication describing the expense amount; and rendering, at the display screen, at the itemized expense field, the indication.

In some embodiments, the indication describing the expense amount comprises an expense category.

In some embodiments, the method further comprises: dividing the receipt image into zones associated with one or more expense categories; rendering, at the display screen, zone indications comprising respective zone actuatable options; and when respective input is received at a zone actuatable option associated with a zone that includes one or more itemized expense amounts, rendering, at the display screen, adjacent the receipt image, one or more itemized expense fields that include the one or more itemized expense amounts.

In some embodiments, the method further comprises: performing character recognition on the receipt image to determine the total amount; determining, based at least partially on the character recognition, an amount by which the total amount is to be adjusted; determining the submission total amount by adjusting the total amount according to the amount by which the total amount is to be adjusted; and populating the total amount field with the total amount and the submission total amount.

In some embodiments, the method further comprises: performing character recognition on the receipt image to determine text in receipt image; rendering, at the display screen, in a text field adjacent the receipt image, the text; causing the text to be translated from a first language to a second language; and rendering, at the display screen, in the text field a translation of the text.

Another aspect of the present specification provides a device comprising: a communication interface; a display screen; and a controller configured to: receive a receipt image; render, at the display screen, the receipt image, the receipt image comprising a total amount region including a total amount of expenses in the receipt image; render, at the display screen, adjacent the receipt image, a total amount field including a submission total amount associated with the total amount; render, at the display screen, at the total amount region of the receipt image, a link between the total amount region and the total amount field; receive, via an actuatable option rendered at the display screen in association with the total amount field, input confirming the submission total amount; and transmit, via the communication interface, to an expense management system, the submission total amount.

In some embodiments, the submission total amount at the total amount field is different from the total amount, and the controller is further configured to: receive an indication of the submission total amount being different from the total amount; and render, at the display screen, the indication.

In some embodiments, the receipt image, as rendered at the display screen, includes an itemized expense region including an expense amount, the expense amount being a portion of the total amount, and the controller is further configured to: render, at the display screen, adjacent the receipt image, an itemized expense field including the expense amount and an adjusted expense amount; render, at the display screen, at the total amount region of the receipt image, a second link between the itemized expense region and the itemized expense field; and prior to transmitting the submission total amount to the expense management system, determine the submission total amount by adjusting the total amount using the adjusted expense amount.

In some embodiments, the receipt image, as rendered at the display screen, includes an itemized expense region including an expense amount, the expense amount being a portion of the total amount, and the controller is further configured to: render, at the display screen, adjacent the receipt image, an itemized expense field associated with the itemized expense region; render, at the display screen, at the itemized expense region of the receipt image, a second link between the itemized expense region and the itemized expense field; receive an indication describing the expense amount; and render, at the display screen, at the itemized expense field, the indication.

In some embodiments, the controller is further configured to: divide the receipt image into zones associated with one or more expense categories; render, at the display screen, zone indications comprising respective zone actuatable options; and when respective input is received at a zone actuatable option associated with a zone that includes one or more itemized expense amounts, render, at the display screen, adjacent the receipt image, one or more itemized expense fields that include the one or more itemized expense amounts.

In some embodiments, the controller is further configured to: perform character recognition on the receipt image to determine the total amount; determine, based at least partially on the character recognition, an amount by which the total amount is to be adjusted; determine the submission total amount by adjusting the total amount according to the amount by which the total amount is to be adjusted; and populate the total amount field with the total amount and the submission total amount.

Another aspect of the present specification provides a non-transitory computer-readable medium storing a computer program, wherein execution of the computer program is for: receiving, at a controller of a computing device, a receipt image; rendering, at a display screen, the receipt image, the receipt image comprising a total amount region including a total amount of expenses in the receipt image; rendering, at the display screen, adjacent the receipt image, a total amount field including a submission total amount associated with the total amount; rendering, at the display screen, at the total amount region of the receipt image, a link between the total amount region and the total amount field; receiving, via an actuatable option rendered at the display screen in association with the total amount field, input confirming the submission total amount; and transmitting, via a communication interface, to an expense management system, the submission total amount.

Another aspect of the present specification provides a computer program product comprising program code instructions stored on a computer readable medium to execute the method steps according to the method aspects and embodiments set out above when said program is executed on a computer.

BRIEF DESCRIPTIONS OF THE DRAWINGS

For a better understanding of the various examples described herein and to show more clearly how they may be carried into effect, reference will now be made, by way of example only, to the accompanying drawings in which.

Figure 1:
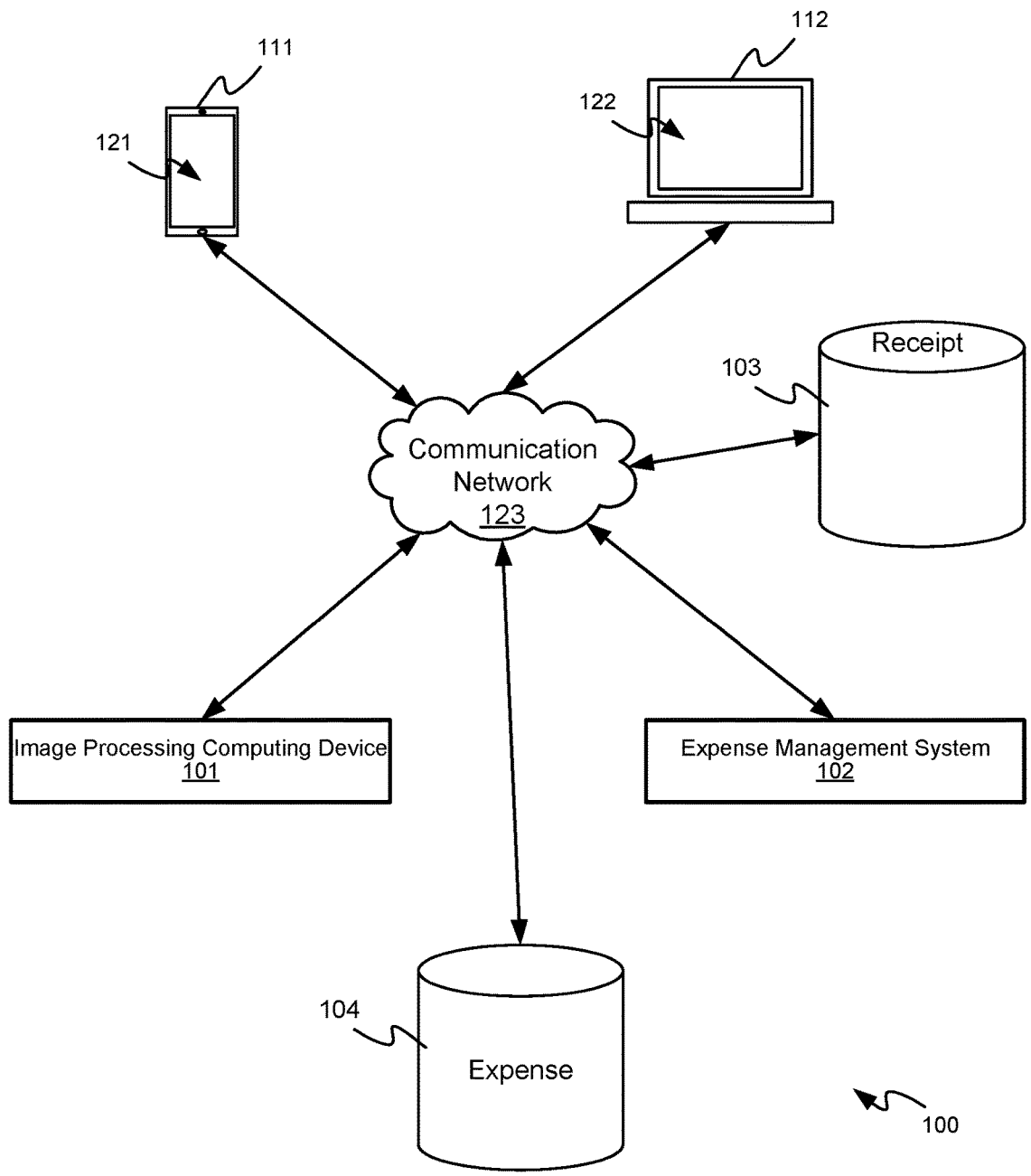
FIG. 1 depicts a system for processing images that include amounts, according to non-limiting examples.
Figure 5:
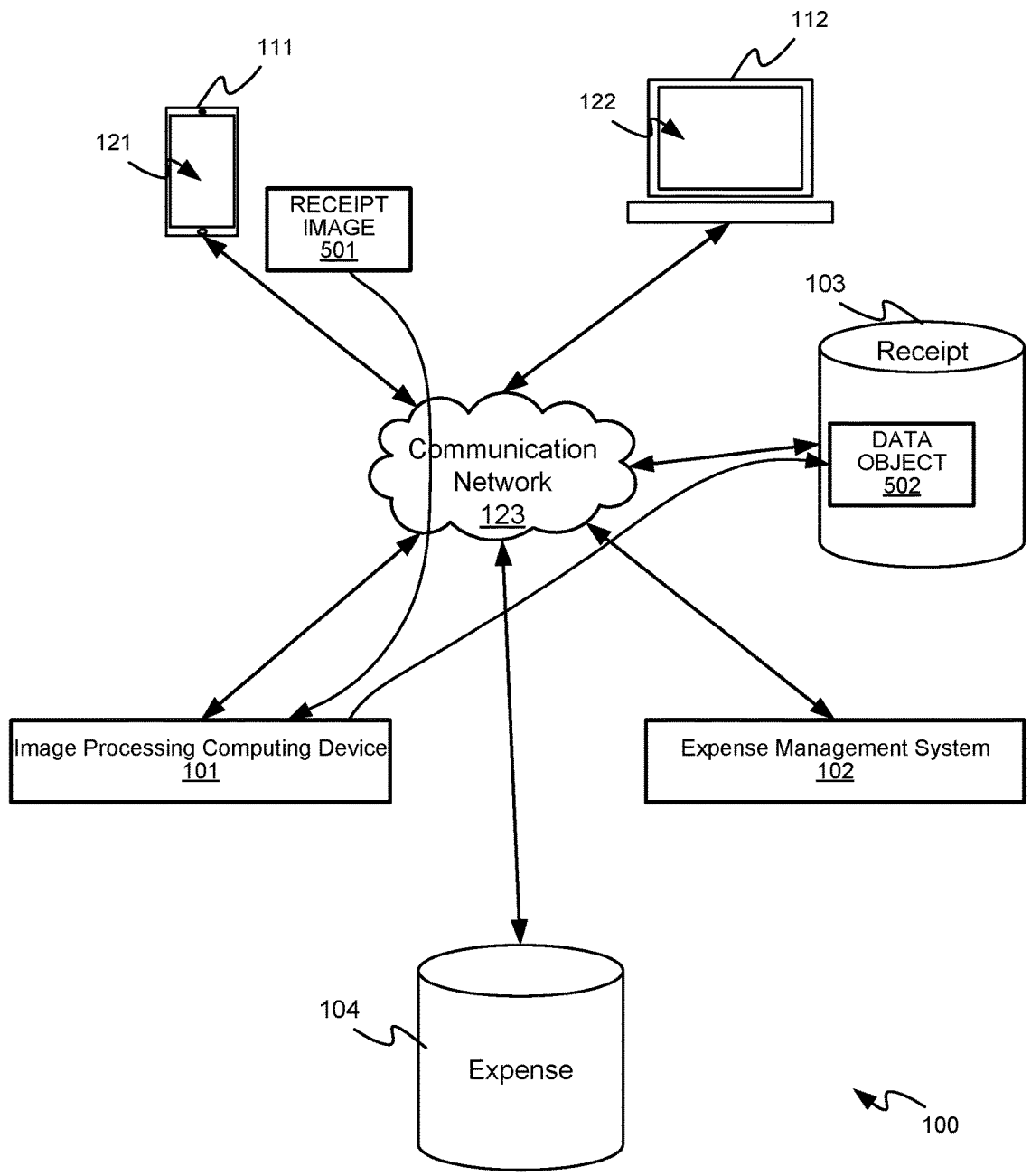

FIG. 5 an image processing computing device of the system of FIG. 1, receiving an image, according to non-limiting examples.

Figure 6:
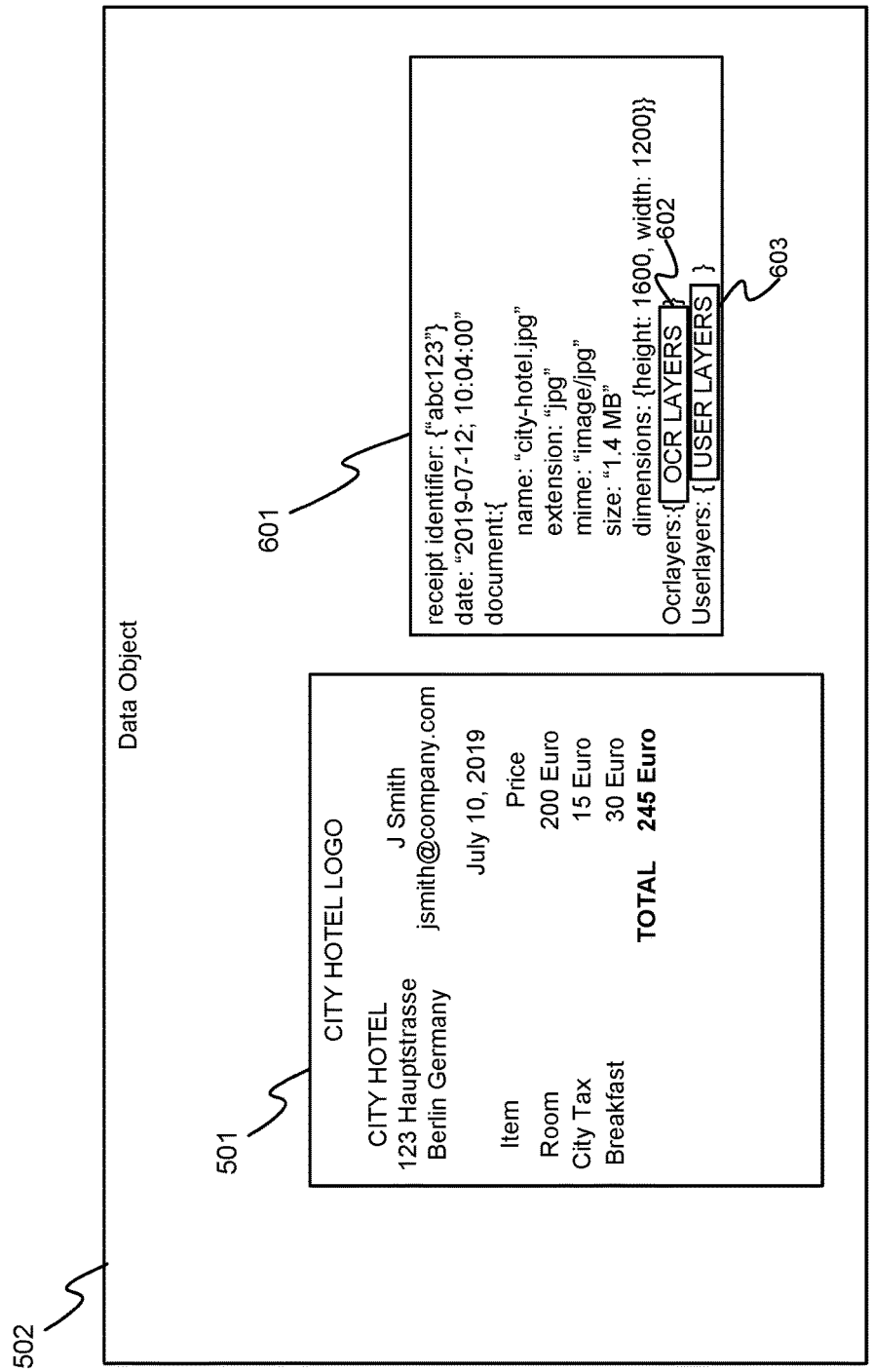

FIG. 6 depicts a data object incorporating a receipt image and a digital receipt, according to non-limiting examples.

Figure 7:
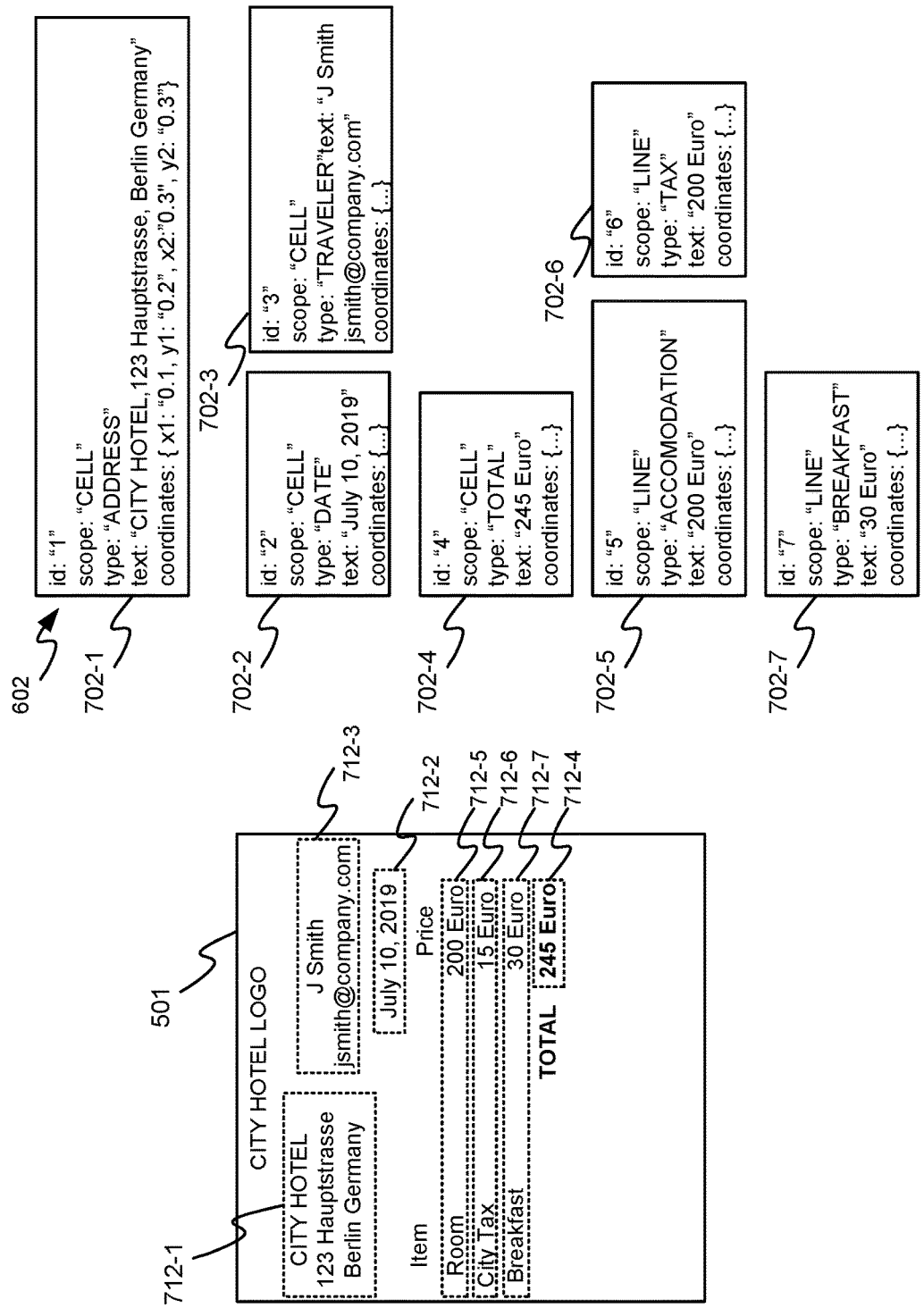

FIG. 7 depicts an example receipt image and example optical character layers of the digital receipt, according to non-limiting examples.

Figure 8:
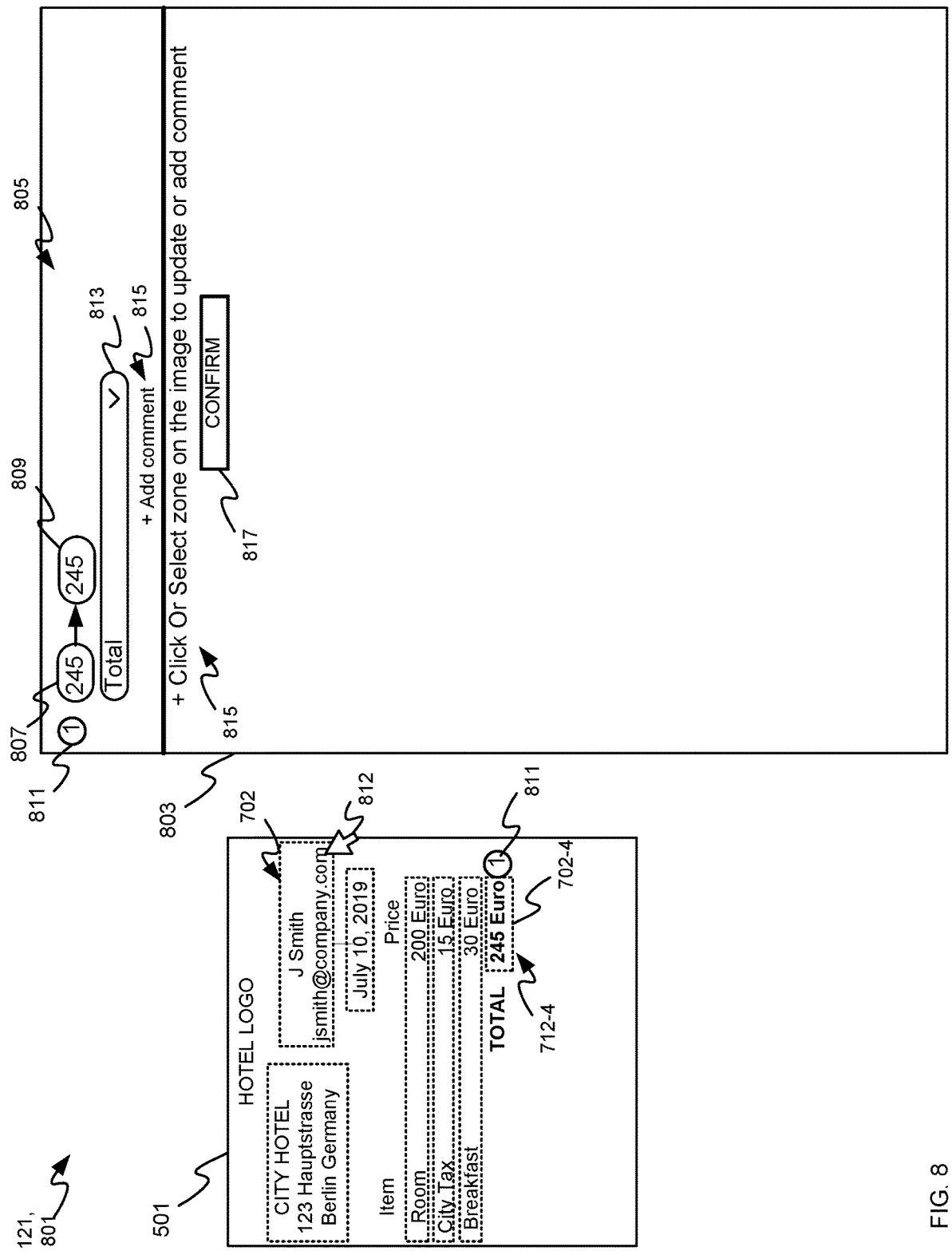

FIG. 8 depicts a graphic user interface rendered at a display screen of a device of the system of FIG. 1, the graphic user interface including a total amount field, according to non-limiting examples.

Figure 9:
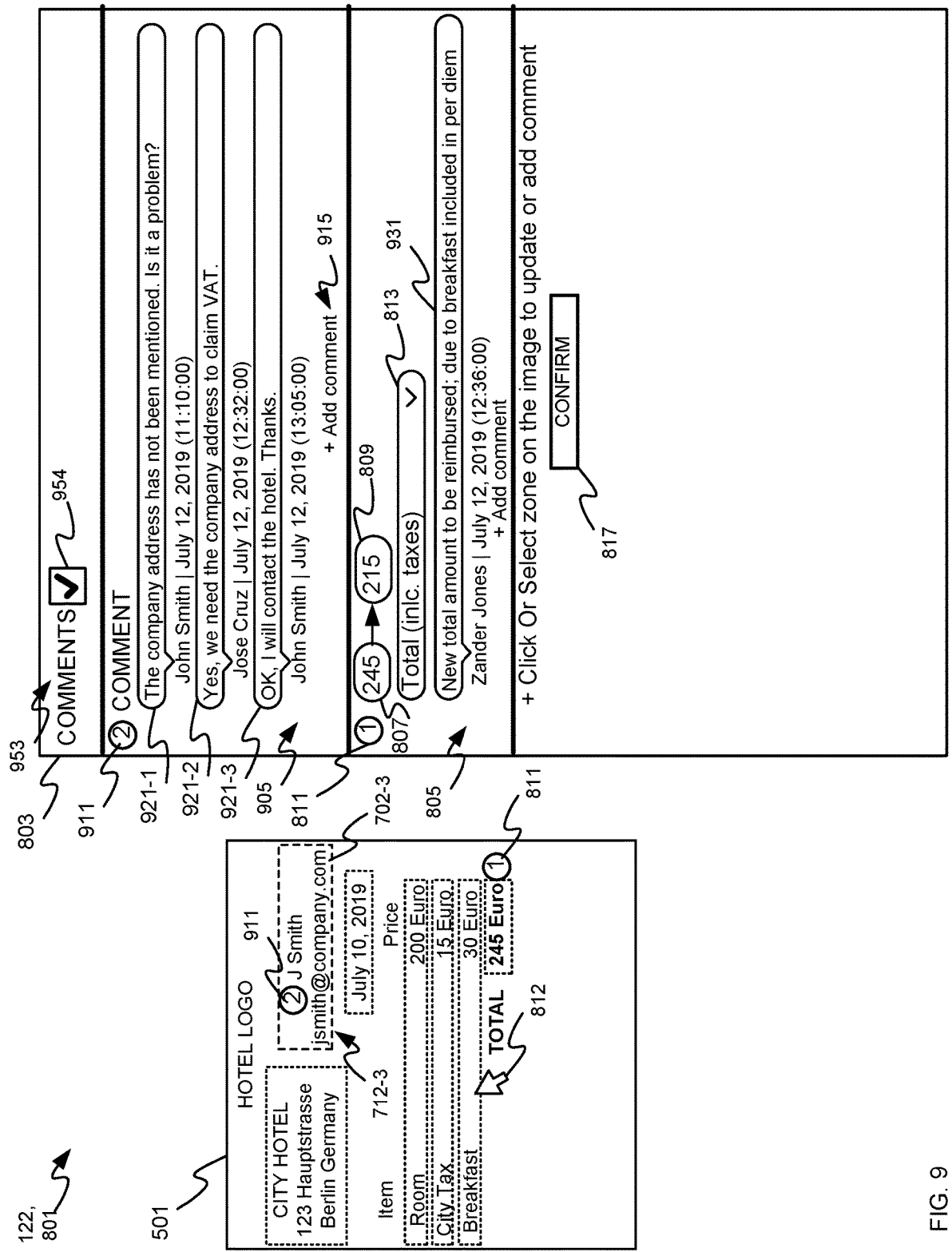

FIG. 9 depicts the graphic user interface updated to include a comment field, according to non-limiting examples.

Figure 10:
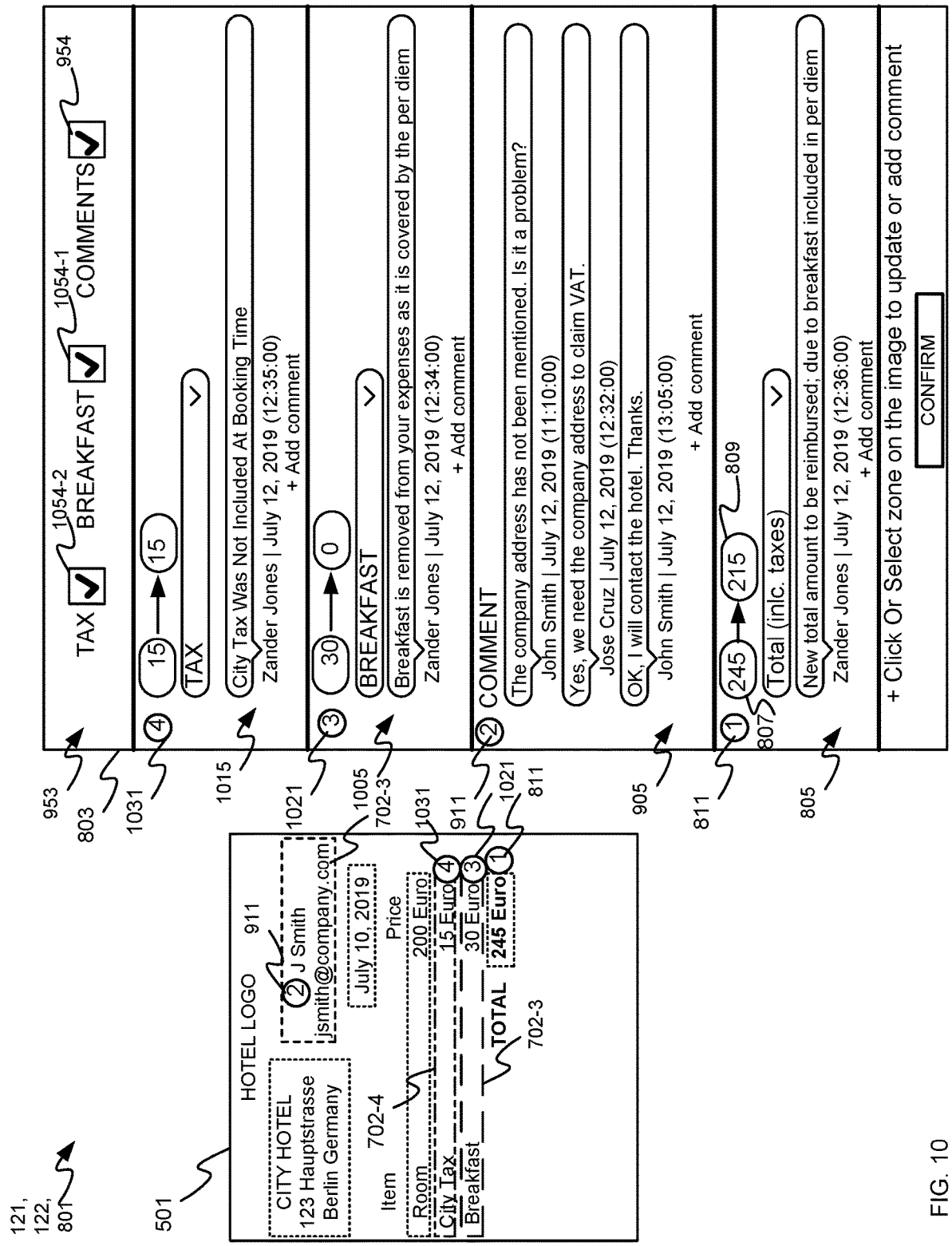

FIG. 10 depicts the graphic user interface updated to include itemized expense fields, according to non-limiting examples.

Figure 11:
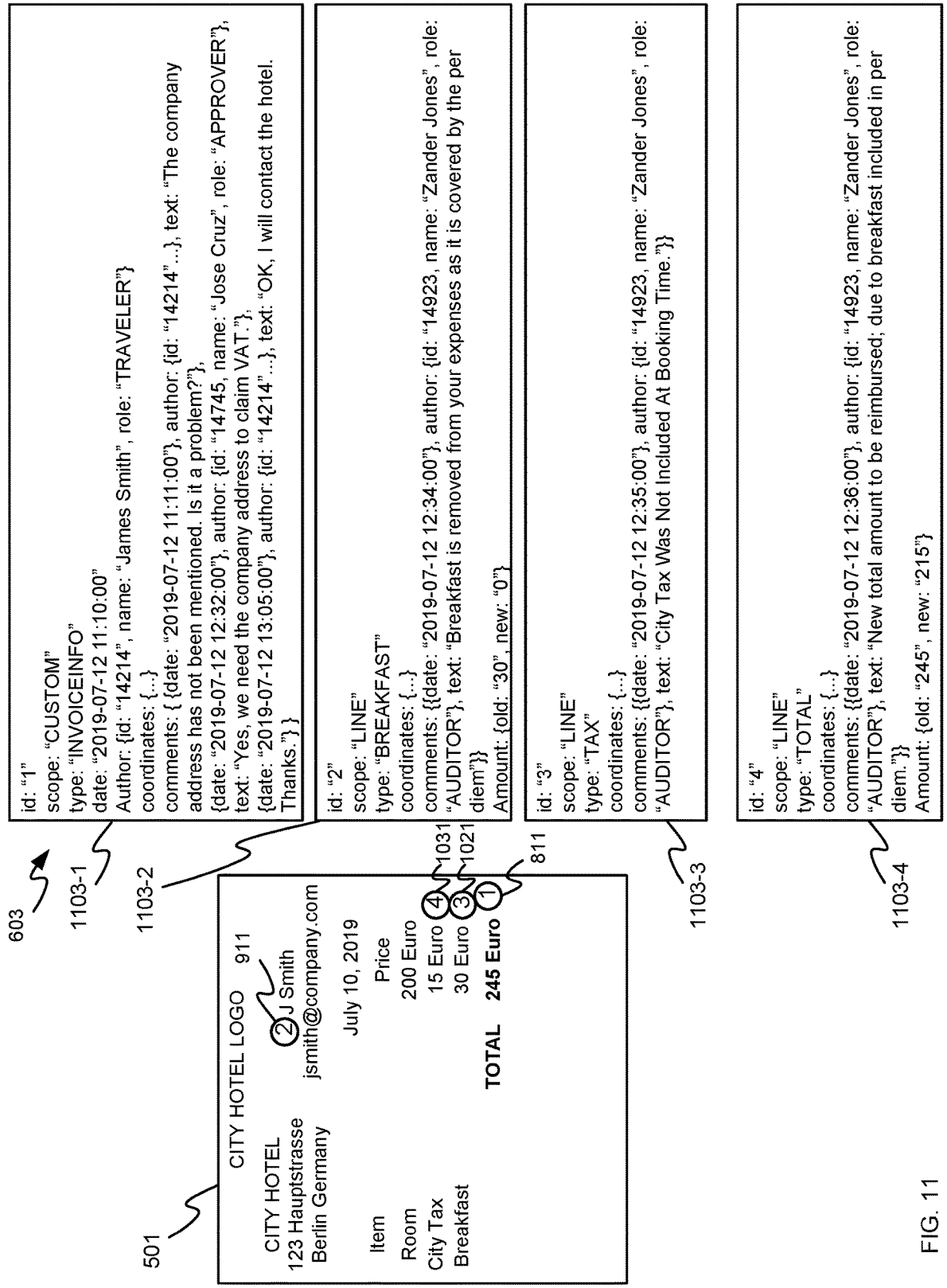

FIG. 11 depicts an example receipt image and example user layers of the digital receipt, according to non-limiting examples.

DETAILED DESCRIPTION

Attention is directed to FIG. 1 which depicts a system 100 for processing images that include amounts, for example, images of receipts. The system 100 includes: an image processing computing device 101 for processing images that include amounts; an expense management system 102 for managing expenses and/or reimbursement of expenses, for example as indicated on the images that include the amounts; a database 103 for storing the images that include the amounts (such as receipt images); an expense database 104 for storing data associated with expenses; at least one communication device 111 for submitting the images that include amounts and/or interacting with the images that include the amounts; and, optionally, at least one computing device 112 for interacting with the images that include the amounts.

The components of the system 100 are generally in communication via a communication network 123 (interchangeably referred to hereafter as the network 123), and communication links between components of the system 100 are depicted in FIG. 1, and throughout the present specification, as double-ended arrows between respective components. The network 123 includes any suitable combination of wireless and/or wired communication networks and, similarly, the communication links may include any suitable combination of wireless and/or wired links.

While the functionality of the system 100 may be for processing any suitable images that include amounts, hereafter the system 100 will be described with respect to receipt images, such as images of receipts that are to be reimbursed using the expense management system 102, for example as submitted using the at least one communication device 111.

The components of the system 100 (e.g. other than the network 12) may generally be associated with, and/or operated by, an entity, such as a company, and the like, that may reimburse employees for expenses indicated on receipt images via the system 100.

While FIG. 1 depicts only one communication device 111, the system 100 may include any suitable number of communication devices 111, for example configured to submit respective receipt images for reimbursement by the expense management system 102. The at least one communication device 111 will be interchangeably referred to hereafter as the communication device 111. Furthermore, while the communication device 111 is depicted as a mobile device, in other examples the communication device 111 may comprise a personal computer, a laptop computer and the like. Regardless, the communication device 111 may generally be operated by an associated user, for example an employee of the entity associated with the system 100. The employee may operate the communication device 111 to submit receipt images for reimbursement by the expense management system 102. For example, the employee may operate the communication device 111 to acquire an image of a receipt (e.g. using a camera of the communication device 111 to acquire an image of a paper receipt) and transmit the resulting receipt image to the image processing computing device 101 for processing prior to submission to the expense management system 102. However, the receipt image may be acquired in any suitable manner including, but not limited, as an attachment to an email and/or a message, scanning a paper receipt document, and uploading to the image processing computing device 101 (e.g. via a scanner and/or via the communication device 111 and/or via the communication device 111 comprising a scanner) and the like.

The communication device 111 may be further configured for interaction with the image processing computing device 101, for example via the network 123, for interacting with the receipt images, to edit and/or approve amounts to be submitted to the expense management system 102 for reimbursement.

Similarly, while FIG. 1 depicts only one computing device 112, the system 100 may include any suitable number of computing devices 112, for example configured to communicate with the image processing computing device 101, for example via the network 123, for interacting with the receipt images, for example to edit and/or approve amounts to be submitted to the expense management system 102 for reimbursement by the expense management system 102. The at least one computing device 112 will be interchangeably referred to hereafter as the computing device 112. Furthermore, while the computing device 112 is depicted as a personal computer, in other examples the computing device 112 may comprise a mobile device, a laptop computer and the like. Regardless, the computing device 112 may generally be operated by an associated user to edit and/or approve amounts to be submitted to the expense management system 102 for reimbursement by the expense management system 102 (e.g. as submitted by the employee associated with the communication device 111). In some examples, the associated user of the computing device 112 may be a supervisor, an auditor, and the like, of the employee associated with the communication device 111, and/or have a role as an "APPROVER" and/or an "AUDITOR" in the system 100. The supervisor, the approver, the auditor, and the like, may approve receipts submitted by the employee using the computing device 112 for reimbursement by the expense management system 102 and/or adjust amounts for reimbursement. However, in other examples, the computing device 112 may be optional and the employee associated with the communication device 111 may approve their own receipts for reimbursement by the expense management system 102.

Furthermore, as depicted, each of the devices 111, 112 include a respective display screen 121, 122, as well as any other components for implementing the functionality of the devices 111, 112.

The image processing computing device 101 comprises any suitable computing device, server, cloud-computing device, and the like, configured to receive and process receipt images from the communication device 111, and the like, and enable interaction with the receipt image by the communication device 111 and/or the computing device 112, for example via a browser application (and/or in a client-server environment and the like). As such, the image processing computing device 101 and the communication device 111 (and/or the computing device 112) may include respective applications to enable communication therebetween for receipt image submission and/or interaction, including, but not limited to, browser applications, as described in further detail below. In particular, the image processing computing device 101 may be configured to generate a data object that includes the receipt image, as well as an amount to be reimbursed, and the data object may be stored at the database 103 and/or submitted to the expense management system 102 for reimbursement. As will be described in further detail below, image processing computing device 101 may be configured to itemize expenses and/or expense amounts in the receipt image.

The image processing computing device 101 may further have access to expense rules, which may be stored at a memory of the image processing computing device 101 and/or may be stored at the expense management system 102 and/or the database 103 and/or the database 104. The expense rules may generally indicate how expenses are to be reimbursed and/or which expenses are to be reimbursed. For example, the expense rules may indicate that certain meals are not to be reimbursed as such meals may be provided for via a per diem; for example, expenses for breakfasts may not be reimbursed. Similarly, the expense rules may indicate that minibar charges, and/or other types of charges, are not to be reimbursed. However, any suitable expense rules are within the scope of the present specification and may be applied by the image processing computing device 101.

The expense management system 102 generally comprises any suitable computing device, server, cloud-computing device, and the like, configured to receive receipt images and/or data objects that include the receipt images from the image processing computing device 101, for example after the receipt images have been processed by the image processing computing device 101. Alternatively, the expense management system 102 may access and/or retrieve data objects that include receipt images, and amounts to be reimbursed, from the database 103. For example a receipt images may generally be received with an amount to be reimbursed to the employee associated with the communication device 111 in any suitable manner; indeed, while details of the expense management system 102 are not described herein, it is understood that the expense management system 102 may reimburse the employee associated with the communication device 111 via pay-cheques, electronic pay-cheques, electronic bank transfers, cheques, electronic cheques and the like. Furthermore, the expense management system 102 may update the database 104 with the amounts reimbursed, and/or maintain expense rules that are accessible to the image processing computing device 101 via the network 123.

The database 103 may generally store receipt images, and/or data objects that include receipt images, for example before and/or after reimbursement, and amounts that were reimbursed, for example to assist with maintaining a record of expenses (e.g. at the database 104) of the entity associated with the system 100.

The database 104 may generally store record of expenses of the entity associated with the system 100, and may be updated based on the receipt images, and/or amounts reimbursed to employees, and the like, as well as any other suitable expenses. For example, the database 104 may include an accounting database.

In general, when expenses of the entity are incorrect, for example, as stored at the database 103 and/or the database 104, and/or as reimbursed to the employee associated with the communication device 111, considerable processing resources may be wasted to electronically correct the expenses and/or to electronically obtain a refund of the reimbursed expenses and/or to resolve resulting electronic accounting discrepancies.

While particular database structures at the databases 103, 104 are described herein, the components of the databases 103, 104 may be stored according to any suitable structure and/or in any suitable manner including, but not limited to, storing receipt images and/or data objects and/or expense data in one or more databases and/or one or more memories (e.g. that may or may not include databases and/or a database structure).

Furthermore, the databases 103, 104 may maintain other types of data other than receipt images and/or data objects and/or expense data. For example, one or more the databases 103, 104 may maintain expense rules that are accessible to the image processing computing device 101 via the network 123.

In some examples, the database 103 may be a component of the expense management system 102 and/or the image processing computing device 101. Indeed, the image processing computing device 101 may be a component of the expense management system 102.

Furthermore, while the devices 111, 112 are described herein as interacting with the image processing computing device 101, in some examples such interaction may occur via of the expense management system 102. Put another way, one or more devices of the expense management system 102 may intermediate between the devices 111, 112, the image processing computing device 101, and the databases 103, 104.

For example, turning to FIG. 2, before discussing the functionality of the system 100, certain components of the image processing computing device 101 will be discussed in greater detail. While as described herein the image processing computing device 101 is configured to process images that include amounts, functionality of the image processing computing device 101, may be distributed between the various components thereof, including, but not limited to, one or more of the devices 101, 111, 112 and the expense management system 102. Hence, one or more of the components of the system 100 generally includes one or more devices for processing images that include amounts. For conciseness, the image processing computing device 101 will be interchangeably referred to hereafter as the device 101.

Figure 2:
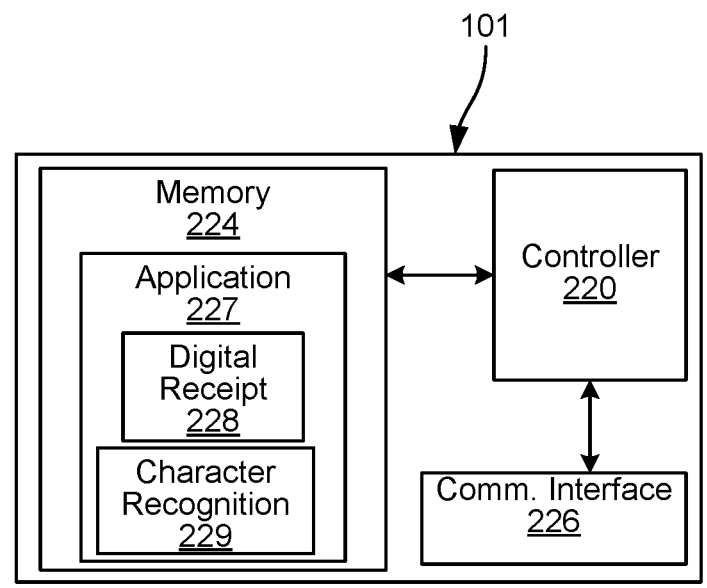
FIG. 2 depicts a device for processing images that include amounts, according to non-limiting examples.

As shown in FIG. 2, the device 101 includes at least one controller 220, such as one or more processors, central processing units (CPU), and the like. The controller 220 is interconnected with a memory 224, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 224 are generally comprised of one or more integrated circuits (ICs).

The controller 220 is also interconnected with a communication interface 226, which enables the device 101 to communicate with the other components of the system 100 via one or more communication links and/or the network 123. The communication interface 226 therefore includes any necessary components (e.g. network interface controllers (NICs), radio units, and the like) to communicate with the other components of the system 100 via the network 123. The specific components of the communication interface 226 are selected based on upon the communication links and/or the network 123. The device 101 can also include input and output devices connected to the controller 220, such as keyboards, mice, displays, and the like (not shown).

The components of the device 101 mentioned above can be deployed in a single enclosure, or in a distributed format, for example distributed geographically. In some examples, therefore, the device 101 includes a plurality of controllers, either sharing the memory 224 and communication interface 226, or each having distinct associated memories and communication interfaces. In some of these examples, the device 101 comprises one or more cloud-computing devices.

While not depicted, in some examples, the memory 224 may store the database 103 and/or a portion thereof. The memory 224 stores a plurality of computer-readable programming instructions, executable by the controller 220, in the form of various applications, including an application 227 for processing images that include amounts. As will be understood by those skilled in the art, the controller 220 executes the instructions of the application 227 (and any other suitable applications) in order to perform various actions defined by the instructions contained therein. In the description below, the controller 220, and more generally the device 101, are may be configured to perform those actions. It will be understood that they are so configured via the execution (by the controller 220) of the instructions of the applications stored in memory 224.

Execution of the application 227 by the controller 220, configures the controller 220 and/or the device 101 to: receive a receipt image; render, at a display screen (e.g. one or more of the display screens 121, 122), the receipt image, the receipt image comprising a total amount region including a total amount of expenses in the receipt image; render, at the display screen, adjacent the receipt image, a total amount field including a submission total amount associated with the total amount; render, at the display screen, at the total amount region of the receipt image, a link between the total amount region and the total amount field; receive, via an actuatable option rendered at the display screen in association with the total amount field, input confirming the submission total amount; and transmit, via the communication interface 226, to the expense management system 102, the submission total amount.

In particular, as depicted, the application 227 includes two components: a digital receipt component 228 and a character recognition component 229. The application 227 may use both of the components 228, 229 to enable the controller 220 to perform the functionality described herein. For example, the digital receipt component 228 may comprise a respective application for generating a data object that includes the receipt image, as described below. In yet further examples, when the controller 220 executes the application 227 and/or the digital receipt component 228, the controller 220 is further configured to divide the receipt image into zones and/or regions associated with one or more expense categories, and extract expense amounts from the zones and/or regions. Other functionality of the device 101 will be described in more detail below.

Similarly, the character recognition component 229 may comprise a respective application for performing character recognition and/or optical character recognition (OCR) and the like, on the receipt image, for example to identify total amount of expenses, and/or expense amounts, in the receipt image, as described below In some examples, the application 227 may include machine learning and/or deep-learning and/or neural network-based algorithms, and the like, which have been trained and/or configured to implement at least a portion of the functionality of the device 101. The one or more machine learning algorithms and/or deep learning algorithms of the application 227 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network algorithm is within the scope of present examples.

In some examples, the application 227 may also include and/or maintain the expense rules as described above.

While structure of the devices 111, 112 is not described in detail, the devices 111, 112 are understood to have a similar structure as the device 101, but adapted for the functionality of the devices 111, 112. For example, each of the device 111, 112 generally includes a respective display screen 121, 122 which may be controlled by the device 101 to render, for example, the receipt images and fields as described herein, for example in browser application, and the like. Furthermore, the devices 111, 112 generally include input such as keyboards, mice, and the like (not shown).

Figure 3:
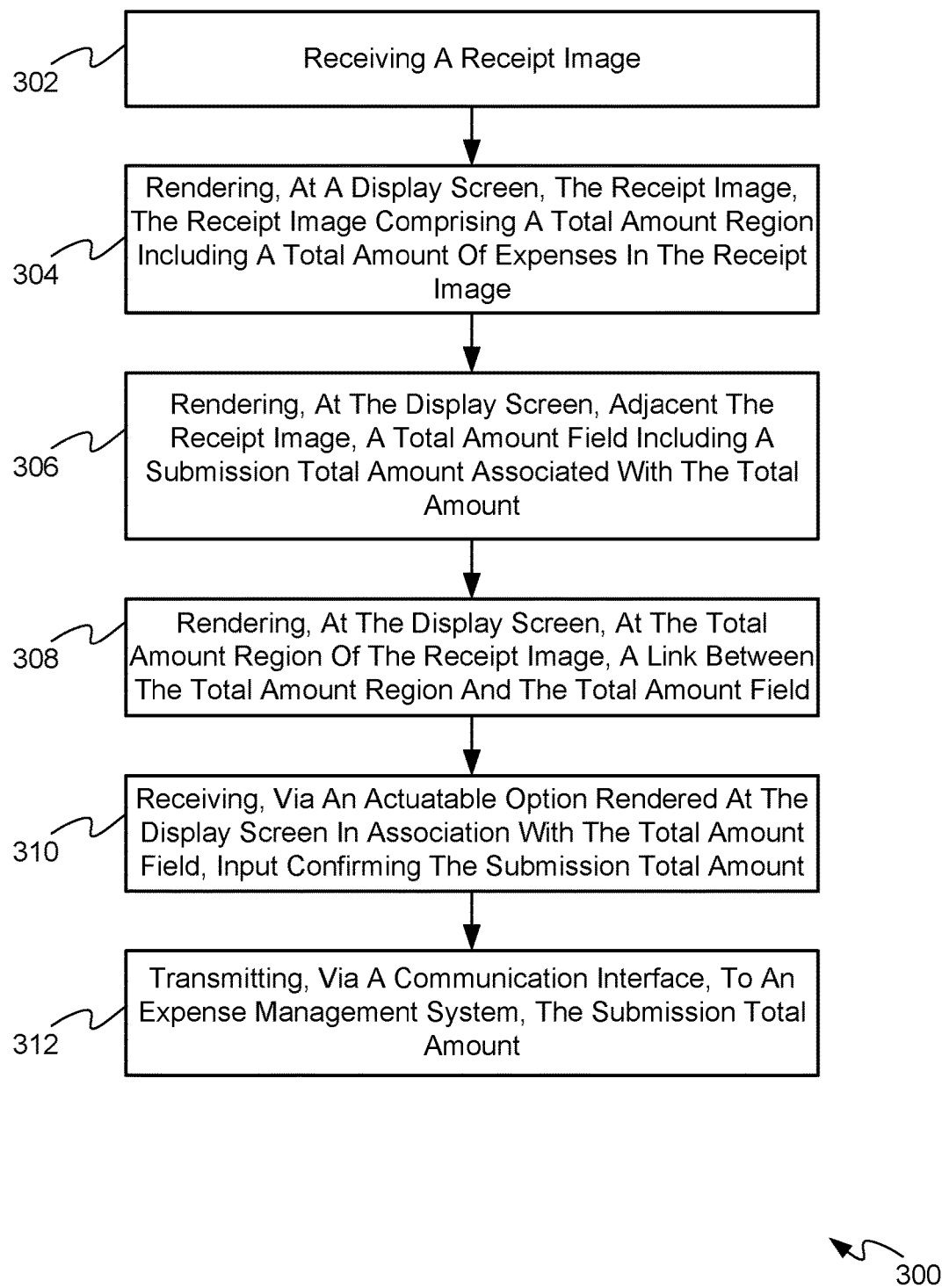
FIG. 3 depicts a method for processing images that include amounts, according to non-limiting examples.

Attention is now directed to FIG. 3 which depicts a flowchart representative of a method 300 for processing images that include amounts. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 224 for example, as the application 227. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 receives a receipt image, for example from the communication device 111, via the communication interface 226. Alternatively, the controller 220 and/or the device 101 may receive the receipt image by retrieving the receipt image from the database 103. For example, the communication device 111 may initially transmit the receipt image to the device 101 (e.g. as intermediated by the expense management system 102), which may store the receipt image at the database 103 (e.g. as a component of a data object, described below), and the receipt image may later be retrieved from the database 103 for interaction therewith, for example, when one or more of the devices 111, 112 transmits a request to interact with the receipt image (e.g. to edit expenses associated with the receipt image) to the device 101. Furthermore, receipt images and/or data objects that include receipt images, may be stored and/or retrieved using identification numbers, and the like.

In some examples, when the receipt image is received, the controller 220 and/or the device 101 may perform OCR on the receipt image to detect text, and the like, in the receipt image. In these examples, the controller 220 and/or the device 101 may generate a data object, that includes the receipt image and an OCR layer (and/or more than one OCR layer) which includes text detected in the receipt image, as well as data indicative of where the text is located in the receipt image (e.g. in cartesian coordinates, and the like, using an origin selected with reference to the receipt image).

In particular, as will be described below, the controller 220 and/or the device 101 may perform OCR on the receipt image to detect different types of expense amounts and categorize the expense amounts.

A different OCR layer may be generated for each type of expense amount and/or for each region (which may also be referred to as a zone) that includes an expense amount and/or for each set of text in the receipt image.

The data object may be stored at the database 103, and when one or more of the devices 111, 112 transmits a request to interact with the receipt image (e.g. to edit expenses associated with the receipt image) to the device 101, the controller 220 and/or the device 101 may retrieve the data object which includes the receipt image and the OCR layers.

As will be described below, the data object may further include user layers, as well as a digital receipt which comprises a container describing the receipt image, and associated layers (e.g. the OCR layers and the user layers).

At a block 304, the controller 220 and/or the device 101 renders, at a display screen, the receipt image, the receipt image comprising a total amount region including a total amount of expenses in the receipt image. Hereafter, examples will be described with respect to the receipt image being rendered at one or more of the display screens 121, 122 of the communication device 111 and/or the computing device 112, depending on which of the devices 111, 112 is interacting with the device 101, though the receipt image may be rendered at any suitable display screen including, but not limited to, a display screen of the device 101.

In particular, at the block 304, the controller 220 and/or the device 101 may render the receipt image by transmitting the receipt image, along with OCR layers and/or user layers of the data object to one or more of the devices 111, 112 for rendering at a respective display screen 121, 122 in a browser application. Interactions between the device 101 and/or the one or more of the devices 111, 112 may occur via the browser application. Hereafter, references to rendering various items at a display screen are understood to occur via such a browser application, though such items may alternatively be rendered via any suitable application and/or in any suitable manner (e.g. via a client-server application, and the like).

In examples where the data object is generated, the OCR layers are also rendered at the display screen 121, 122 (e.g. using OCR text and coordinates thereof) such that text in the receipt image may be selectable at the OCR layers using an input device (e.g. of the device 111 and/or the device 112, using the browser application).

At a block 306, the controller 220 and/or the device 101 renders, at the display screen 121, 122, adjacent the receipt image, a total amount field including a submission total amount associated with the total amount. For example, the total amount field may be rendered in a graphic user interface (GUI) adjacent the receipt image at the display screen 121, 122. Examples of such a GUI are described in more detail below.

In some examples, the controller 220 and/or the device 101 may perform character recognition, and/or OCR, on the receipt image to determine the total amount, which may also hence be included in an OCR layer. In some examples the controller 220 and/or the device 101 may receive input indicative of the total amount and/or the submission total amount (e.g. via an input device of the communication device 111 and/or the computing device 112, depending on which of the devices 111, 112 is interacting with the device 101, and/or at via an input device of the image processing computing device 101). For example, the input may indicate the total amount and/or an amount by which the total amount is to be adjusted (e.g. either higher or lower) and the submission total amount may be determined by adjusting the total amount accordingly. Such an adjustment may generally reflect a correction to the total amount with respect to how much of the total amount is to be reimbursed to the employee that submitted the receipt image, which may obviate errors at the databases 103, 104 thereby saving processing resources in the system 100, as compared to if the total amount was not corrected and/or an incorrect amount was reimbursed.

Alternatively, the receipt image may further comprise itemized expense amounts of the total amount which may be detected using character recognition, and the like, which may be incorporated into an OCR layer. The itemized expense amounts may be used to adjust the total amount to determine the submission total amount. For example, breakfast may already be reimbursed via a per diem, as determined from expense rules described above, and hence an itemized expense, determined to be for a breakfast, may by subtracted from the total amount to arrive at the submission total amount. Itemized expense amounts are described in more detail below.

The controller 220 and/or the device 101 may determine, based at least partially on the character recognition, an amount by which the total amount is to be adjusted; determine the submission total amount by adjusting the total amount according to the amount by which the total amount is to be adjusted; and populate the total amount field with the total amount and the submission total amount.

At a block 308, the controller 220 and/or the device 101 renders, at the display screen 121, 122, at the total amount region of the receipt image, a link between the total amount region and the total amount field.

For example, the link may comprise a visual link indicative of the total amount region. In some of these examples, the visual link may comprise an icon, and the like, rendered at the total amount field, and a similar icon may be rendered at the total amount region of the receipt image, to indicate that the total amount field and the total amount region, as rendered at the display screen 121, 122, are linked.

In yet further examples, the link may comprise a combination of a visual link and an active link, such that, when an input device (e.g. of one or more of the devices 111, 112) is used to interact with the active link at the total amount field, the total amount region is highlighted at the display screen, and/or the display screen is controlled to indicate the total amount region (e.g. the OCR layer may be controlled to highlight a total amount of the total amount region and/or a user layer may include a highlight of the total amount field, as described below). In some examples, a similar combination of a visual link and an active link may be rendered at the total amount region of the receipt image, such that, when an input device (e.g. of one or more of the devices 111, 112) is used to interact with the active link at the total amount region, the total amount field is highlighted at the display screen, and/or the display screen is controlled to indicate the total amount field.

In some examples, the controller 220 and/or the device 101 may generate a user layer (and/or more than one user layer) at the data object which may include comments, amounts, and the like, which may be rendered at the GUI. The user layer may include more than one user layer with different comment types, expense amount types etc., and are described in further detail below.

In yet further examples, the controller 220 and/or the device 101 may: perform character recognition on the receipt image to determine text in receipt image; render, at the display screen 121, 122, in a text field (e.g. a comment field, and the like) adjacent the receipt image, the text; cause the text to be translated from a first language to a second language; and render, at the display screen 121, 122, in the text field a translation of the text. For example, the controller 220 and/or the device 101 may have access to a translation device, a third-party translation service, electronic language dictionaries, and the like; in these examples, the controller 220 and/or the device 101 may translate text in the receipt image using such devices, services and/or dictionaries, and render translated text, for example in the GUI. In yet further examples, the translated text may be included in a user layer.

In some examples, the submission total amount at the total amount field, and the total amount at the total amount region of the receipt image may be the same.

However, in other examples, the submission total amount at the total amount field may be different from the total amount at the total amount region of the receipt image. In these examples, the method 300 may include (e.g. at the block 306, the block 308 and/or another block of the method 300), the controller 220 and/or the device 101: receiving an indication of the submission total amount being different from the total amount; and rendering, at the display screen, the indication. For example, the indication may comprise text, and the like, which may be received via an input device (e.g. of one or more of the devices 111, 112) and/or selected from a dropdown menu, and the like, via the input device, the text indicating that the submission total amount is different from the total amount.

At a block 310, the controller 220 and/or the device 101 receives, via an actuatable option rendered at the display screen in association with the total amount field, input confirming the submission total amount. For example, the actuatable option may comprise a virtual button, and the like which, when actuated via an input device (e.g. of one or more of the devices 111, 112) causes the submission total amount to be submitted to the expense management system 102 and/or the database 103.

At a block 312, the controller 220 and/or the device 101 transmits (e.g. in response to receiving the input confirming the submission total amount), via the communication interface 226, to the expense management system 102 and/or the database 103, the submission total amount.

At the block 312, the controller 220 and/or the device 101 may transmit the submission total amount with the receipt image and/or with a data object that includes the receipt image.

The data object may incorporate the submission total amount and/or the data object may comprise the submission total amount, for example in the user layer.

Indeed, the data object may generally include several layers as described above: the receipt image; the OCR layers which includes text detected in the receipt image with data indicative of where the text is located in the receipt image, with a different OCR layer for each category of expense amounts indicated by the text; and user layers, which may include comments, the total amount, the total submission amount, itemized expense amounts, as well as any indications of expenses and/or expense categories and the like, which may be determined via receipt of input at an input device and/or automatically by the controller 220 and/or the device 101. An example of such a data object is described in more detail below.

Indeed, in some examples, the controller 220 and/or the device 101 may receive the receipt image and divide the receipt image into zones associated with expense categories, and/or any other suitable category, and the like. Indications of the zones may be provided in the OCR layers and/or the user layers of the data object.

Figure 4:
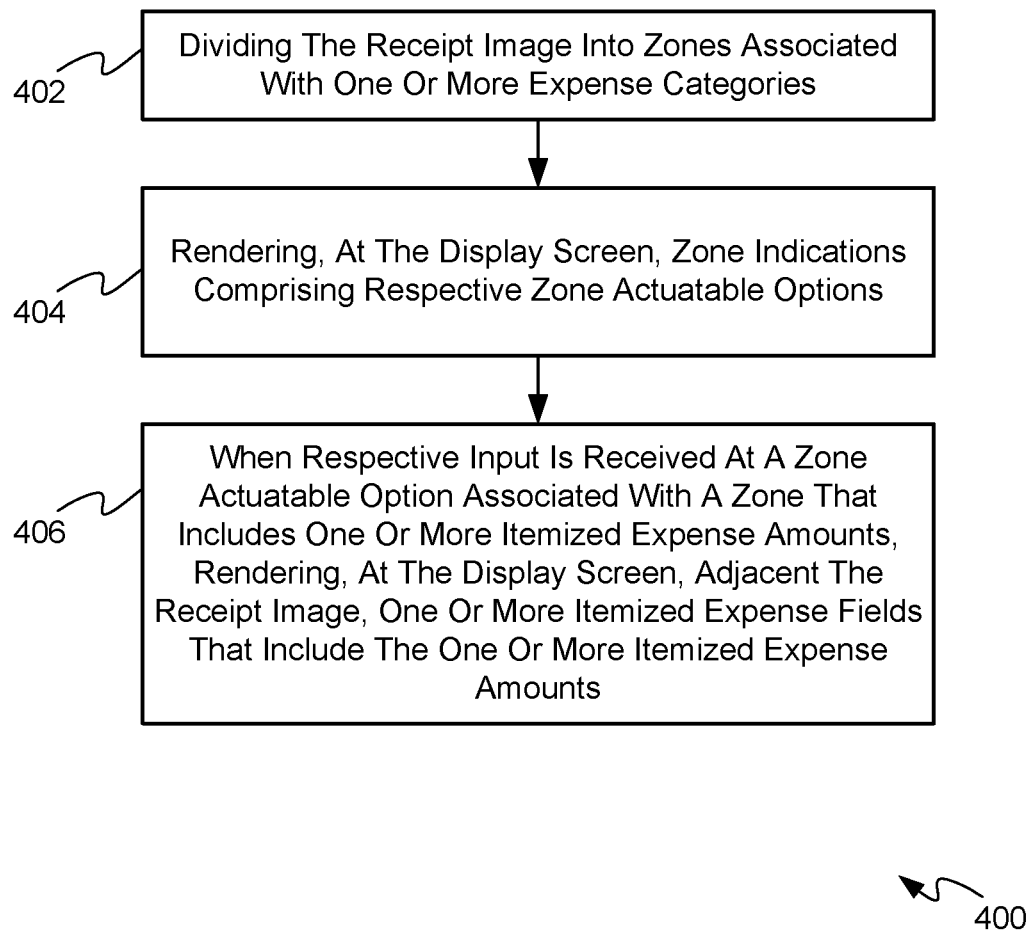
FIG. 4 depicts a method for determining categories of an image, according to non-limiting examples.

For example, attention is now directed to FIG. 4 which depicts a flowchart representative of a method 400 for determining categories of an image, and in particular the receipt image received at the block 302 of the method 300. The operations of the method 400 of FIG. 4 correspond to machine readable instructions that are executed by the device 101, and specifically the controller 220 of the device 101. In the illustrated example, the instructions represented by the blocks of FIG. 4 are stored at the memory 224 for example, as the application 227. The method 400 of FIG. 4 is one way in which the controller 220 and/or the device 101 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

It is further understood that while the method 400 is described with respect to a receipt image, the method 400 may be adapted to determine for any suitable image.

It is yet further understood that the method 400 may be performed in conjunction with the method 300, for example at any suitable block and/or blocks of the method 300.

At a block 402, the controller 220 and/or the device 101 divides the receipt image into zones associated with one or more expense categories. In particular, the block 402 may occur after the receipt image is received at the block 302. The expense categories may include expense categories for reimbursement, including, but not limited to, meals, accommodations, entertainment, and the like, however any type of suitable expense category is within the scope of the present specification (e.g. including, but not limited to expense categories for materials and/or inventory purchases, and the like). Indications of the zones may be incorporated into the OCR layers of the data object, along with coordinates of where the zones are located in the receipt image such that, when the receipt image and the OCR layers areas rendered at the display screen, indications of the zones may be rendered at the receipt image by rendering the OCR layers at the display screen. The zones may include regions of the receipt image that include text associated with an expense and/or other types of text. The terms "zone" and "region" may be used interchangeably hereafter.

For example, when the controller 220 and/or the device 101 performs OCR on the receipt image to detect text therein, the text may generally include expense amounts, which may be portions of the total amount. The expense amounts may be associated with text indicating a type of an expense amount. For example, the receipt image may indicate an expense amount for "Breakfast" and/or for meals, another expense amount for a "Room" and/or accommodation, and the like. Indications of the zones may be rendered at the receipt image, for example by color coding text in the OCR layers and/or by including highlights, and the like in the user layers and/or at a GUI that includes data from the user layers. Put another way, the receipt image, as rendered at the display screen at the block 304 of the method 300, may include an itemized expense region and/or more than one itemized expense regions, including an expense amount, the expense amount being a portion of the total amount. An itemized expense region may be itemized and/or categorized using associated text indicating a type of an expense amount.

At a block 404, the controller 220 and/or the device 101 renders, at the display screen (e.g. the same display screen where the image receipt is rendered), zone indications comprising respective zone actuatable options. In some of these examples, the zone indications of the block 404 may comprise respective zone actuatable options in the GUI where the total amount and the submission total amount are rendered at the block 306 of the method 300. The respective zone actuatable options may be selected to render, in the GUI, the expense amounts, for example in itemized expense fields.

At a block 406, the controller 220 and/or the device 101, when respective input is received at a zone actuatable option associated with a zone that includes one or more itemized expense amounts, renders, at the display screen, adjacent the receipt image, one or more itemized expense fields that include the one or more itemized expense amounts.

In some examples, the respective zone actuatable options may be selected to turn on and off corresponding indications of the zones.

Hence, for example, when a particular zone includes breakfast expense amounts, a respective zone actuatable option for turning on and off breakfast expense amounts in the GUI may be provided, for example a breakfast actuatable option. When the meal actuatable option is selected to "turn on" breakfast expense amounts, the breakfast expense fields may be provided in the GUI that include the breakfast expense amounts determined from a breakfast OCR layer. Similarly, corresponding indications of breakfast zones and/or regions rendered at the receipt image may be turned on and off by highlighting text in the breakfast OCR layer and/or by turning the breakfast layer "on", and/or by providing corresponding indications of breakfast zones and/or regions at a user layer.

As described above, the receipt image, as rendered at the display screen, may include an itemized expense region including an expense amount, the expense amount being a portion of the total amount. As also described above, the expense amounts as itemized and/or categorized may be in zones of the receipt image. In some examples, the controller 220 and/or the device 101 may render, at the display screen, adjacent the receipt image, an itemized expense field including the expense amount and an adjusted expense amount. The adjusted expense amount may be an amount by which the expense is adjusted, for example according to the expense rules as described above. The adjusted expense amount may be stored in a user layer of the data object.

In some examples, the controller 220 and/or the device 101 may further receive an indication describing the expense amount, whether adjusted or not adjusted. The indication may comprise an expense category and/or a comment received via an input device (and/or selected from a drop-down menu). The indication may be received via an OCR layer; for example, text describing the expense amount may be detected in the OCR layer, and received at the controller 220. The controller 220 and/or the device 101 may use the text "as-is", for example as an expense category or convert the text to an associated expense category; for example, the text "Room" may be changed to "Accomodation". The controller 220 and/or the device 101 render, at the display screen 121, 122, at the itemized expense field, the indication (e.g. to indicate an expense category), for example at the itemized expense field.

The controller 220 and/or the device 101 may further render, at the display screen, at the total amount region of the receipt image, a second link between the itemized expense region and the itemized expense field. For example, such a second link may be similar to the visual links and/or active links described above with respect to the total amount region and the total amount field, but for the itemized expense field including the expense amount. Different links may be provided for different itemized expenses; however, the different links may be visually coded (e.g. color coded and/or differently numbered) according to a respective zone; for example, links for breakfasts may be one color and/or one number, links for accommodation may be another color and/or another number, etc.

The controller 220 and/or the device 101 may further, prior to transmitting the submission total amount to the expense management system 102 and/or the database 103, determine the submission total amount by adjusting the total amount using the adjusted expense amount.

The method 300 and the method 400 are next described with respect to specific examples, though other examples are within the scope of the present specification.

Attention is next directed to FIG. 5 which is substantially similar to FIG. 1 with like components having like numbers. In particular, FIG. 5 depicts the communication device 111 transmitting a receipt image 501 to the device 101, which receives the receipt image 501 (e.g. at the block 302 of the method 300), generates a data object 502 that includes the receipt image 501, and stores the data object 502 at the database 103 (e.g. via the network 123). In particular, when generating the data object 502, the device 101 may perform character recognition on the receipt image 501, for example using the character recognition component 229; the data object 502 may include any OCR layers that result. Furthermore, the receipt image 501 may be assigned a receipt identifier and/or identification number which is included in the data object 502. The data object 502, including the receipt image 501, may then be accessed by any of the devices 111, 112 for interaction therewith as described hereafter, for example using the receipt identifier. Furthermore, while the communication device 111 is depicted communicating with the device 101, communication with the device 101 may be intermediated by the expense management system 102.

Attention is next directed to FIG. 6 which depicts an example of the receipt image 501 and the data object 502. As depicted, the data object 502 includes the receipt image 501 and associated data which will be referred to hereafter as a digital receipt 601. However, in other examples, the data object 502 may be optional, and the receipt image 501 and the digital receipt 601 may be stored and/or associated in any suitable manner.

As depicted, the receipt image 501 comprises an image in any suitable format (e.g. Joint Photographic Experts Group (JPEG), Portable Document Format (PDF), Hypertext Markup Language (HTML) and the like) that includes a receipt for reimbursement, and hence includes a total amount (as depicted "245 Euro") to be reimbursed, though, as described below, the total amount may be adjusted before reimbursement. The receipt image 501 further includes itemized expense amounts which, when summed, add to the total amount, the itemized expense amounts being in three different categories as described below. Hence, for example, the receipt image 501 comprises a receipt from a hotel, and itemized expense amounts for a room (e.g. "200 Euro"), city tax (e.g. "15 Euro") and breakfast (e.g. "30 Euro"). The receipt image 501 further includes an address of the hotel, a date, and an identifier of the traveler to whom the receipt was issued (e.g. "J Smith jsmith@company.com"). For example, the traveler may be the employee associated with the communication device 111. While the receipt image 501 includes only three itemized expense amounts, one to a line, the receipt image 501 may include any suitable number of itemized expense amounts, for any suitable categories. While the depicted categories for the itemized expense amounts are different, two more itemized expense amounts may be in a same category.

The digital receipt 601 generally comprises a container that includes data describing the receipt image 501. As depicted, the digital receipt 601 comprises: a receipt identifier (e.g. "abc123"), a date (e.g. and time) that the receipt image 501 was uploaded and/or parsed to obtain OCR layers; document meta data of the receipt image 501 (e.g. a filename, a file extension, a mime type, a file size, and dimensions of the file, for example in pixels); a list 602 of OCR layers; and a list 603 of user layers. The lists 602, 603 are described in more detail below, however initially the list 603 of user layers may be empty as, when the digital object 502 is initially generated, no user layers may be initially generated.

While as depicted, the digital receipt 601 is in a JavaScript Object Notation (JSON) format, the digital receipt 601 may be in any suitable format and/or any suitable structured format including, but not limited to, an eXtensible Markup Language (XML) format.

Attention is next directed to FIG. 7 which depicts the receipt image 501 and the list 602 of OCR layers 702-1, 702-2, 702-3, 702-4, 702-5, 702-6, 702-7 (interchangeably referred to hereafter, collectively, as the OCR layers 702 and, generically, as an OCR layer 702). Each of the OCR layers 702-1, 702-2, 702-3, 702-4, 702-5, 702-6, 702-7 respectively include character recognition data associated with different zones and/or regions 712-1, 712-2, 712-3, 712-4, 712-5, 712-6, 712-7 (interchangeably referred to hereafter, collectively, as the regions 712 and, generically, as a region 712). For example, each of the regions 712 is indicated by a corresponding box depicted in dashed lines, within which text, and the like, from an OCR layer 702 may be rendered for selection at a display screen 121, 122. The regions 712 may be identified when the block 402 of the method 400 is executed at the device 101.

The OCR layers 702 generally comprise: an identifier; a scope (e.g. an identification of the associated region 712 being a LINE, COLUMN, CELL, and the like of the receipt image 501); a type (e.g. a category) of an OCR layer (e.g. as depicted, an ADDRESS (e.g. of the hotel), a DATE, a TRAVELER, a TOTAL AMOUNT, ACCOMMODATION, TAX, BREAKFAST, however any suitable categories are within the scope of the present specification); coordinates (e.g. defined by top left corner (x1, y1) and bottom right corner (x2, y2) of the associated region 712, however the coordinates may be absolute or relative); and text in the region 712 (e.g. in a raw format). The categories may be determined using the character recognition component 229, and/or the categories may be extracted from a region 712 and/or the categories may be determined programmatically and/or by training a machine learning algorithm of the character recognition component 229 and/or the application 227 to recognize the categories.

As depicted the receipt image 501 has been divided into seven regions 712 and/or zones and hence seven OCR layers 702 have been generated. The regions 712-1, 712-2, 712-3 are not associated with an expense amount, but include text which indicate information about the hotel, the date and the traveler, and hence the associated OCR layers 702-1, 702-2, 702-3 include the associated text, and are categorized accordingly.

Similarly, the regions 712-4, 712-5, 712-6, 712-7 are associated with expense amounts, and include text which indicate the expense amounts, as well as an associated category of the expense. Hence the associated OCR layers 702-4, 702-5, 702-6, 702-7 include the associated expense amounts, and are categorized accordingly. For example, the region 712-4 includes a total amount of the expenses in the receipt image 501, and the associated OCR layer 702-4 includes the total amount of the expenses as text, along with the category (e.g. type) "TOTAL". Hence, the region 712-4 may be interchangeably referred to as the total amount region 712-4.

Similarly, regions 712-5, 712-6, 712-7 includes itemized expense amounts (and hence may be referred to as itemized expense regions and/or itemized expense zones) in the receipt image 501, and the associated OCR layers 702-5, 702-6, 702-7 includes the associated expense amounts as text, along with a respective category (e.g. type), respectively "ACCOMMODATION", "TAX", "BREAKFAST". In particular, the category "ACCOMMODATION" may be generated from the text "Room" from the region "712-5", for example to use a more general term for the category. Furthermore, while the term "BREAKFAST" is used in the OCR layer 702-7, for example as extracted from the region 712-7, another category may be used, such as "MEALS", and the like. Indeed, the device 101 and/or the controller 220 may be configured to categorize the expenses from the itemized expense regions of the receipt image 501 in any suitable manner.

Attention is next directed to FIG. 8 which depicts a GUI 801 rendered (e.g. at the block 304 of the method 300) at a display screen, as depicted the display screen 121, for example in a browser application. In these examples, the communication device 111 has uploaded the receipt image 501 to the device 101 (e.g. via the browser application), and the device 101 has generated the data object 502, and the associated digital receipt 601 (e.g. and the OCR layers 702). The device 101 has further rendered (e.g. at the block 304 of the method 300) a web page in the browser application that includes the receipt image 501 for example with the text of the OCR layers 702 rendered at the respective coordinates, as indicated via the dashed lines in FIG. 8. Hence, in contrast to FIG. 7, in FIG. 8 the dashed lines represent locations of the text of the OCR layers 702.

The GUI 801 further includes a user interaction area 803 rendered adjacent the receipt image 501. The area 803 may be used to interact with the receipt image 501, for example to change an amount to be reimbursed and/or provide annotations for the receipt image 501.

For example, as depicted, the device 101 has rendered (e.g. at the block 306 of the method 300) a total amount field 805 that includes a submission total amount associated with the total amount. For example, the total amount field 805 includes a field 807 populated with the total amount from the total amount region 712-4 and/or the OCR layer 702-4, as well as a field 809 that includes the amount (e.g. a submission total amount) to be submitted for reimbursement to the expense management system 102. As depicted, the amount in each of the fields 807, 809 is the same, but may be adjusted, as described below.

The total amount field 805 further includes a link 811 between the total amount region and the total amount field. As depicted, the link 811 includes a visual link of an icon (e.g. that includes the number "1"), and a similar icon (e.g. that also includes the number "1") may be rendered at the total amount region 712-4 of the receipt image 501, to visually link the total amount field 805 and the total amount region 712-3 (e.g. the total amount field 805 comprises information associated with, and/or extracted from, the total amount region 712-3). However, the link 811 may be color coded and/or visually coded in any suitable manner.

In other examples, the link 811 may comprise an active link; for example, the link 811 may comprise code, and the like, embedded at the total amount field 805 such that, when a pointer 812 operated via an input device of the communication device 111, and the like, is used to select and/or hover at the total amount field 805, the total amount region 712-4 may be highlighted in the GUI 801 (e.g. which may include, but is not limited to, highlighting text in the associated OCR layer 702-4 rendered at the display screen 121). Similarly, an active link may be at the total amount region 712-4 and/or the OCR layer 702-4, such that, when the pointer 812 is used to select and/or hover at the total amount region 712-4 and/or the OCR layer 702-4, the total amount field 805 may be highlighted in the GUI 801 in any suitable manner (e.g. a box surrounding the total amount field 805 may change color and/or line thickness etc.).

As depicted, the total amount field 805 further includes an indication 813 of the total amount and/or the submission total amount; as depicted, the indication 813 comprises text in a dropdown menu, which may be populated using the text "TOTAL" detected at the total amount region 712-4 and/or from the category of the OCR layer 702-4. The indication 813 may alternatively be populated by selecting the dropdown menu using the pointer 812, and selecting from various text provided. Alternatively, the indication 813 may be populated by receiving text from an input device.

As depicted, the total amount field 805 further includes an actuatable option 815 to add a comment. When the actuatable option 815 is selected (e.g. via the pointer 812), a new indication (e.g. a comment) may be generated at the total amount field 805, as described in more detail below.

The total amount field 805 may be generated automatically. For example, the controller 220 may identify the OCR layer 702-4 as including a total amount using the text "TOTAL" and responsively generate the total amount field 805, and the link 811.

Alternatively, the total amount field 805 may be generated using an input device. For example, the employee associated with the communication device 111 may operate the pointer 812 using an input device to select the OCR layer 702-4. In these examples, prior to such selection, the total amount field 805 may not be present at the area 803. When the OCR layer 702-4 is selected, total amount field 805 may be generated, along with the link 811, and the input device may be used to populate the fields 807, 809.

Alternatively, as depicted, the area 803 may include an actuatable option 815 which, when selected via the pointer 812, may cause a prompt to select an OCR layer 702 to be rendered at the display screen 121.

As depicted, the area 803 includes an actuatable option 817, rendered at the display screen 121 in association with the total amount field 805 which, when actuated (e.g. at the block 310 of the method 300), for example via the pointer 812, causes the submission total amount in the field 809 to be transmitted (e.g. at the block 312 of the method 300) and/or submitted to the expense management system 102 and/or the database 103. For example, the data object 502 (i.e. the digital receipt 601) may be updated to include a user layer that includes the submission total amount in the field 809 and submitted to the expense management system 102 (e.g. including, but not limited to, storing the updated data object 502 in the database 103).

Such a transmission may cause a message to be transmitted to the computing device 112 to prompt the user of the computing device 112 to review the data object 502. In some examples, such a message may be submitted to more than one computing device 112, for example to a computing device 112 of an approver (e.g. a supervisor of the employee associated with the communication device 111) and/or an auditor (e.g. an employee of the entity associated with the system 100 tasked with auditing expenses).

The data object 502, for example as updated, including the receipt image 501, may be again retrieved, for example when the computing device 112 interacts with the device 101 to request the receipt image 501, and the method 300 may be repeated to update the submission total amount, add more user layers, including comments, visual links, and the like. Such interactions may cause more fields associated with regions and/or zones of the receipt image 501 to be generated in the area 803, and zone actuatable options to be rendered therein.

Similarly, the communication device 111 may again be used to retrieve the data object 502 for further interaction. Indeed, the data object 502 may be retrieved multiple times by the devices 111, 112 for interaction therewith.

For example, attention is next directed to FIG. 9 which depicts the GUI 801 as rendered at the display screen 122 (i.e. of the computing device 112) after the data object 502 has been updated to include a comment field 905 associated with the OCR layer 702-3 and/or the region 712-3 as indicated by a link 911 which is different from the link 811. For example, when the OCR layer 702-3 is selected, a display screen 121, 122 may be controlled to provide a selection of a type of field to add, for example an expense-related field, a comment field (e.g. as depicted in FIG. 9) and the like.

For example, a first comment 921-1 may have been generated when the pointer 812 was operated to select the OCR layer 702-3 to add the field 905 to the area 803, which was then saved in the data object 502 (e.g. the digital receipt 601) as another user layer. Further comments 921-2, 921-3 may be added upon subsequent retrievals of the data object 502 and actuation of an actuatable option 915 (e.g. to add a comment to the field 905). Upon the completion of a comment the data object 502 may again be transmitted to the expense management system 102, and the like. Each comment 921-1, 921-2, 921-3 may be rendered with an identifier of a user (e.g. an operator of a device 111, 112) that added the comment, as well as an associated date and/or time.

FIG. 9 also depicts that the total expense field 805 has been updated to change the submission total amount in the field 809. Similarly, the indication 813 has been updated to show that the total amount includes taxes. Further, a comment 931 has been added to the field 805 to include a reason for the change in the submission total amount. As depicted the comment 931 is rendered with an identifier of a user that added the comment 931, as well as an associated date and/or time. As depicted, the change may be received via an input device.

However, in other examples, the change may be implemented by the controller 220 and/or the device 101 executing expense rules. For example, an expense rule may indicate that a breakfast is not to be reimbursed and the expense amount for the breakfast in the receipt image 501 may be deducted from the total amount. Indeed, in these examples, such a reduction may occur when the data object 502 is generated.

As depicted, the area 805 has further been updated to include (e.g. at the block 404 of the method 400) a zone indication 953 that includes a zone actuatable option 954 which, as depicted, has been actuated and/or automatically actuated. The zone actuatable option 954 is specifically associated with any regions 712 and/or zones, and/or associated OCR layers 702 and/or comment fields, and may be used to turn the comment fields (such as the comment field 905) on or off in the area 803. For example, when the pointer 812 is used to deselect the actuatable option 954, the comment field 905, as well as the link 911, may be removed from the display screen 122. Similarly, when the pointer 812 is used to select the actuatable option 954, the comment field 905, as well as the link 911, may be rendered at the display screen 122. Furthermore, when the actuatable option 954 is selected, as depicted indicated using a checkmark, the associated OCR layer 702-3 at the receipt image 501 may be highlighted, for example, as depicted, a box has been drawn around the OCR layer 702-3.

As changes to each of the fields 805, 905 occur, associated user layers may be updated.

When each interaction with the area 803 are complete, the data object 502 may again be submitted to the expense management system 102 via the actuatable option 817.

Indeed, further population of the user layers of the digital receipt 601 may occur and other fields added to the area 803.

For example, attention is next directed to FIG. 10 which depicts the GUI 801 as rendered at the display screen 121 and/or the display screen 122 after four fields 805, 905, 1005, 1015 have been added to the area 803, each associated with a respective zones and/or regions 712, as indicated by associated links 811, 911, 1021, 1031. For example, the links 911, 1021, 1031 may alternatively be referred to as second links 811, 911, 1021, 1031 (e.g. to distinguish from a total expense field link and/or a first link 811).

As described above. The itemized expense field 1005 includes an indication describing an expense amount of the itemized expense field 1005, for example an expense category of "BREAKFAST" (e.g. depicted in a dropdown box of the itemized expense field 1005). The itemized expense field 1005 further includes the expense amount (e.g. "30") for breakfast from the receipt image 501 (e.g. in a field similar to the field 807), which is a portion of the total amount (e.g. "245"), as well as an adjusted expense amount (e.g. "0", for example in a field similar to itemized expense field 1005). In these examples, the reduced expense amount may be populated as input via an input device and/or populated via the controller 220 and/or the device 101 implementing expense rules. Furthermore, in some of these examples, the submission total amount in the field 809 may be determined by adjusting the total amount in the field 807 using the adjusted expense amount from the itemized expense field 1005 (e.g. rather than using input and/or expense rules). For example, as the adjusted expense amount is 30 Euros less than the expense amount of the itemized expense field 1005, the total amount in the field 807 is reduced by 30 Euros to arrive at the submission total amount of 215 Euros in the field 809. Such a determination of the submission total amount in the field 809 may occur prior to transmitting the submission total amount to the expense management system 102.

The itemized expense field 1005 further includes a comment as to why the associated expense amount was adjusted, for example received via an input device.

While the itemized expense field 1015 is not described in detail, the itemized expense field 1015 includes similar information as the itemized expense field 1005, but associated with the expense category "TAX". In particular, a comment of the itemized expense field 1015 indicates a reason why the associated itemized expense is to be reimbursed. Indeed, annotation of the receipt image 501 to include reasons why an associated itemized expense is to be reimbursed may speed up an approval process and which may also make the operation of the system 100 more efficient. An associated expense amount is not adjusted in the depicted example; in examples where an associated expense amount is not adjusted, associated expense fields may be omitted.

As depicted in FIG. 10, the zone indication 953 has been updated to include further zone actuatable options 1054-1, 1054-2 for turning on and off the associated itemized expense fields 1005, 1015 (e.g. at the block 406 of the method 400), as described above with respect to the zone actuatable options 954. For example, as the zone actuatable options 1054-1, 1054-2 are selected, as depicted, the associated OCR layers 702-3, 702-4 at the receipt image 501 may be highlighted, for example, as depicted, boxes of different types have been drawn around the OCR layers 702-3, 702-4 (e.g. and different from the box drawn around the OCR layer 702-2).

FIG. 10 also shows that not all OCR layers 702 have to have an associated field in the area 803, nor an associated user layer. For example, the OCR layer 702-5 for the region 712-5 has not been adjusted and/or has no associated comments. Hence, no associated field in the area 803 has been generated.

As described above, the user layers of the data object 502 (e.g. the digital receipt 601) may be updated when the fields 805, 905, 1005, 1015 are generated and/or populated.

For example, attention is next directed to FIG. 11 which depicts the list 603 of user layers 1103-1, 1103-2, 1103-3, 1103-4 (interchangeably referred to hereafter, collectively, as the user layers 1103 and, generically, as a user layer 1103) along with the receipt image 501, at which links 811, 911, 1021, 1031 are also depicted.

A user layer 1103 generally includes: an identifier (e.g. as depicted a same number as in a respective link 811, 911, 1021, 1031); a scope (e.g. similar to the scope of the OCR layers 702); a type (e.g. similar to the type of the OCR layers 702); a creation date/time; and an author name and/or identifier and/or role (e.g. a user of a device 111, 112 that caused the user layer 1103 to be generated, along with their associated role, such as "TRAVELER", "APPROVER", "AUDITOR" and the like) coordinates (e.g. similar to the scope of the OCR layers 702).

A user layer 1103 may further include comments (e.g. when a corresponding field 805, 905, 1005, 1015 includes comments), which may include: a creation date/time; an author identifier; an author name; an author role; and the text of the comment. A comparison of the user layers 1103-1, 1103-2, 1103-3, 1103-4, with the respective associated fields 805, 905, 1005, 1015 depicted in FIG. 10 show a correspondence between the user layer comments and the field comments.

A user layer 1103 may further include an amount description of an associated field 805, 905, 1005, 1015 field which may include: an initial (e.g. "old") amount (e.g. an expense amount extracted from a field of the receipt image 501) and an adjusted (e.g. "new") amount, as described above. In the depicted user layer 1103-3, as the expense amounts were not adjusted, the amount description is omitted and hence the expense amounts may be omitted when the user layer 1103-3 is next use to populate the itemized expense field 1015.

Any translations of text in an associated field may also be included in a user layer.

Hence, provided herein in a device, system and method for processing images that include amounts, for example to determine adjusted amounts to be submitted and/or stored in a database for reimbursement, which may be used to obviate database errors and/or electronic accounting errors, as well as to provide annotations as to why expense amounts are include in a receipt image, to speed up an approval process.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium.

Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
   receiving, at a controller of a computing device, a receipt image, the receipt image comprising: a total amount region including a total amount of expenses in the receipt image; and an itemized expense region including itemized expense amounts, the itemized expense amounts being portions of the total amount;
   performing, via the controller, character recognition on the receipt image to determine the total amount and the itemized expense amounts;
   determining, based at least partially on the character recognition, the total amount and the itemized expense amounts;
   generating, via the controller, a graphical user interface (GUI) programmed to:
      display the receipt image in a first portion of a display screen;
      display, adjacent the receipt image, an itemized expense region in a second portion of the display screen;
      divide the receipt image into one or more zones according to one or more expense categories, wherein the one or more zones include respective itemized expense amounts;
      embed, in the itemized expense region, zone indications comprising respective zone actuatable options in the itemized expense region, wherein the respective zone actuatable options turn on and off respective expense category regions of the GUI in the itemized expense region adjacent the receipt image, wherein each of the respective zone actuatable options and a respective expense category regions are associated with a respective zone of the receipt image, and wherein the respective expense category regions includes respective fields that receive respective adjusted expense amounts that adjust respective itemized expense amounts of the respective zones of the receipt image; wherein the respective expense category regions include respective comment actuatable options that renders a respective comment field at a respective expense category region for accepting user comments regarding a respective expense category of the respective expense category region;
      embed, in the GUI, at the itemized expense region, adjacent the receipt image: a total amount field populated with the total amount; and a submission total amount field populated with a displayed submission total amount comprising the total amount adjusted by the respective adjusted expense amounts of the respective expense category regions;
      embed, in the GUI, at the itemized expense region, adjacent the receipt image: a confirm button that enables the transmission of a confirmation of the displayed submission total amount to the controller of the computing device, wherein the confirmation of the displayed submission total amount includes the displayed submission total amount and the user comments;
   rendering, via the controller, at the display screen, the GUI;
   receiving, at the controller from the GUI, the confirmation;
   determining, via the controller, a modified submission total amount based on the displayed submission total amount and the user comments;
   and
   providing, via one or more of the controller and the communication interface, to an expense management system, the modified submission total amount.

2. The method of claim 1, further comprising:
   performing the character recognition on the receipt image to determine text in the receipt image;
   generating, at the display screen, in a text field of the GUI adjacent the receipt image, the text;
   causing the text to be translated from a first language to a second language; and
   generating, at the display screen, in the text field, a translation of the text.

3. A device comprising:
   a communication interface;
   a display screen;
   an input device; and
   a controller configured to:
      receive a receipt image, the receipt image comprising: a total amount region including a total amount of expenses in the receipt image; and an itemized expense region including itemized expense amounts, the itemized expense amounts being portions of the total amount;
      perform character recognition on the receipt image to determine the total amount and the itemized expense amounts;
      determine, based at least partially on the character recognition, the total amount and the itemized expense amounts;
      generate a graphical user interface (GUI) programmed to:
         display the receipt image in a first portion of a display screen;
         display, adjacent the receipt image, an itemized expense region in a second portion of the display screen;
         divide the receipt image into one or more zones according to one or more expense categories, wherein the one or more zones include respective itemized expense amounts;
         embed, in the itemized expense region, zone indications comprising respective zone actuatable options in the itemized expense region, wherein the respective zone actuatable options turn on and off respective expense category regions of the GUI in the itemized expense region adjacent the receipt image, wherein each of the respective zone actuatable options and a respective expense category regions are associated with a respective zone of the receipt image, and wherein the respective expense category regions includes respective fields that receive respective adjusted expense amounts that adjust respective itemized expense amounts of the respective zones of the receipt image; wherein the respective expense category regions include respective comment actuatable options that renders a respective comment field at a respective expense category region for accepting user comments regarding a respective expense category of the respective expense category region;

embed, in the GUI, at the itemized expense region, adjacent the receipt image: a total amount field populated with the total amount; and a submission total amount field populated with a displayed submission total amount comprising the total amount adjusted by the respective adjusted expense amounts of the respective expense category regions;

embed, in the GUI, at the itemized expense region, adjacent the receipt image: a confirm button that enables the transmission of a confirmation of the displayed submission total amount to the controller of the computing device, wherein the confirmation of the displayed submission total amount includes the displayed submission total amount and the user comments;

render, at the display screen, the GUI;

receive, from the GUI, the confirmation;

determine a modified submission total amount based on the displayed submission total amount and the user comments;

and provide, via the communication interface, to the expense management system, the adjusted total amount.

4. A non-transitory computer-readable medium storing a computer program, wherein execution of the computer program is for:
receiving, at a controller of a computing device, a receipt image, the receipt image comprising: a total amount region including a total amount of expenses in the receipt image; and an itemized expense region including itemized expense amounts, the itemized expense amounts being portions of the total amount;
performing, via the controller, character recognition on the receipt image to determine the total amount and the itemized expense amounts;
determining, based at least partially on the character recognition, the total amount and the itemized expense amounts;
generating, via the controller, a graphical user interface (GUI) programmed to:
display the receipt image in a first portion of a display screen;
display, adjacent the receipt image, an itemized expense region in a second portion of the display screen;
divide the receipt image into one or more zones according to one or more expense categories, wherein the one or more zones include respective itemized expense amounts;
embed, in the itemized expense region, zone indications comprising respective zone actuatable options in the itemized expense region, wherein the respective zone actuatable options turn on and off respective expense category regions of the GUI in the itemized expense region adjacent the receipt image, wherein each of the respective zone actuatable options and a respective expense category regions are associated with a respective zone of the receipt image, and wherein the respective expense category regions includes respective fields that receive respective adjusted expense amounts that adjust respective itemized expense amounts of the respective zones of the receipt image; wherein the respective expense category regions include respective comment actuatable options that renders a respective comment field at a respective expense category region for accepting user comments regarding a respective expense category of the respective expense category region;

embed, in the GUI, at the itemized expense region, adjacent the receipt image: a total amount field populated with the total amount; and a submission total amount field populated with a displayed submission total amount comprising the total amount adjusted by the respective adjusted expense amounts of the respective expense category regions;

embed, in the GUI, at the itemized expense region, adjacent the receipt image: a confirm button that enables the transmission of a confirmation of the displayed submission total amount to the controller of the computing device, wherein the confirmation of the displayed submission total amount includes the displayed submission total amount and the user comments;

rendering, via the controller, at the display screen, the GUI;

receiving, at the controller from the GUI, the confirmation;

determining, via the controller, a modified submission total amount based on the displayed submission total amount and the user comments;

and providing, via one or more of the controller and the communication interface, to an expense management system, the modified submission total amount.

5. The device of claim 3, wherein the controller is further configured to:
perform the character recognition on the receipt image to determine text in the receipt image;
generate, at the display screen, in a text field of the GUI adjacent the receipt image, the text;
cause the text to be translated from a first language to a second language; and
generate, at the display screen, in the text field, a translation of the text.

6. The non-transitory computer-readable medium of claim 4, wherein execution of the computer program is further for:
performing the character recognition on the receipt image to determine text in the receipt image;
generating, at the display screen, in a text field of the GUI adjacent the receipt image, the text;
causing the text to be translated from a first language to a second language; and
generating, at the display screen, in the text field, a translation of the text.

7. The method of claim 1, wherein the GUI is further programmed to:
display, at the display screen, at the total amount region of the receipt image, a first active link to highlight the submission total region; and display, at the display screen, at the submission total region, a second active link to highlight the total amount region of the receipt image, and wherein the method further comprises:
- receiving, via the input device, an actuation of the first active link and responsively highlighting the submission total region; and
- receiving, via the input device of the computing device, a respective actuation of the second active link and responsively highlighting the total amount region of the receipt image.

8. The device of claim 3, wherein the GUI is further programmed to:
- display, at the display screen, at the total amount region of the receipt image, a first active link to highlight the submission total region; and
- display, at the display screen, at the submission total region, a second active link to highlight the total amount region of the receipt image, and wherein the controller is further configured to:
- receive, via the input device, an actuation of the first active link and responsively highlight the submission total region; and
- receive, via the input device of the computing device, a respective actuation of the second active link and responsively highlight the total amount region of the receipt image.

9. The non-transitory computer-readable medium of claim 4, wherein the GUI is further programmed to:
- display, at the display screen, at the total amount region of the receipt image, a first active link to highlight the submission total region; and
- display, at the display screen, at the submission total region, a second active link to highlight the total amount region of the receipt image, and wherein execution of the computer program is further for:
- receiving, via the input device, an actuation of the first active link and responsively highlighting the submission total region; and
- receiving, via the input device of the computing device, a respective actuation of the second active link and responsively highlighting the total amount region of the receipt image.

\* \* \* \* \*